J. S. Moody,
Lathe Chuck,

N° 81,523.          Patented Aug. 25, 1868.

Witnesses.          Inventor.

Joseph S. Moody.

United States Patent Office.

JOSEPH S. MOODY, OF SACO, MAINE.

Letters Patent No. 81,523, dated August 25, 1868; antedated July 23, 1868.

IMPROVEMENT IN LATHE-CHUCK.

*The Schedule referred to in these Letters Patent and making part of the same.*

TO ALL WHOM IT MAY CONCERN:

Be it known that I, JOSEPH S. MOODY, of Saco, in the county of York, and State of Maine, have invented an "Improvement in Lathe-Chucks;" and I do hereby declare that the following is a full and exact description thereof, reference being had to the accompanying drawings, making a part of this specification.

In that class of chucks known as "universal chucks," the jaws are closed or opened by a wrench acting on the driving-screws of each jaw, each screw acting independent of the others, or by a circular rack in the periphery of the plate, (as in the chuck for which a patent was granted Eli Horton, November 13, 1855, No. 13,787,) all the jaws may be opened or closed simultaneously, by a wrench acting on a single screw; but in this case the jaws cannot be made to work independent of each other without the removal of essential parts. With this style of chuck, in order to set an eccentric or any piece of work out of centre, it is necessary to remove the chuck from the lathe, and, taking it apart, to remove the circular rack, place the jaws in position, replace the rack, and rearrange the other parts before it can be used for the desired purpose; and in order to arrange it for other eccentrics, or ordinary centre-work, it must be again taken apart and adjusted. In either case it will be found necessary to adjust each jaw separately, requiring the employment of much time and trouble to accomplish the desired object.

In the chuck for which a patent was granted Michael Neckermann, April 8, 1856, No. 14,632, the circular gear is thrown out by means of a rod, but the construction of this chuck is expensive, and its operation not by any means convenient.

In the chuck of my invention, I dispense with the circular gear in the periphery of the chuck, and substitute therefor a gear in the centre. I also place the pinions at or near the inner end of the driving-screws, instead of at the outer end, as in all other chucks of this description.

Figure 2:
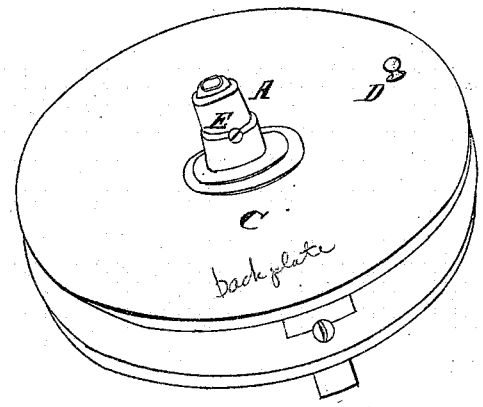
Figure 2 is a back view of chuck.
Figure 3:
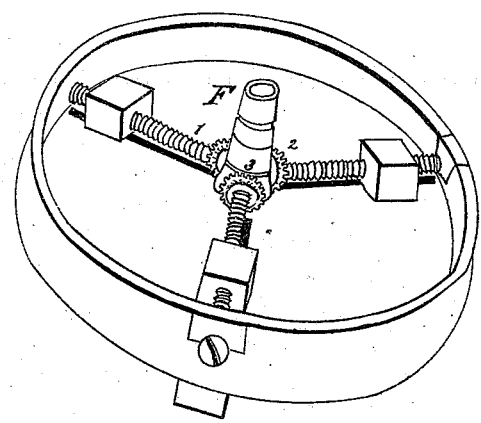
Figure 3 is a view of the interior of the chuck, with back-plate and gear removed.
Figure 4:
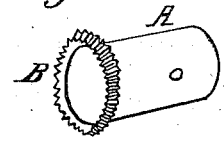
Figure 4 is a view of gear and gear-hub.

My chuck may be either closed or opened, without the use of a wrench or other tool, by either holding fast the gear-hub A, fig. 2, or by pressing the hand on the back-plate C, fig. 2, when attached to the gear-hub or gear, working in the pinions 1, 2, 3, fig. 3, and rotating the chuck, or by holding fast the face-plate, and rotating the gear-hub with back-plate if attached.

The strength of the hand is sufficient to close the jaws tightly on wood or other soft material, and on small pieces of metal. In case it is required to secure heavy work, any small bar may be used as a lever, by resting one end on the centre-shaft or gear-hub, the other being grasped by the hand, the middle of the bar bearing against the knob D, fig. 2, when, on rotating the chuck, the work will be firmly secured, or in case the back-plate is dispensed with, as may be advisable in the larger sizes, to lessen the weight, a wrench may be fitted to grasp the gear-hub for the same purpose, or the face-plate may be held in position, and the gear-hub rotated in the manner explained above.

The set-screw E, fig. 2, is made to play in the groove F, fig. 3, for the purpose of retaining the gear-hub in place. If it is desired to set an eccentric or any work out of centre, it is readily accomplished by loosening the set-screw E, when the gear-hub is moved back enough to throw it out of gear with the pinions, then, by the application of a common screw-driver or other suitable instrument, one or more of the jaws may be set out of centre, as may be desired. By replacing the gear-hub, and securing by means of the set-screw, the chuck is in perfect order. By a similar operation the jaws are again placed in order for regular centre-work.

Figure 1:
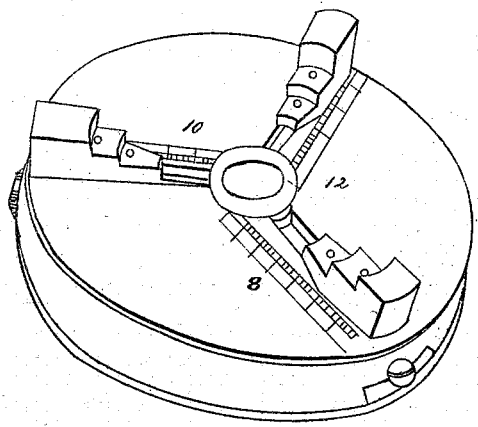
Figure 1 is a front view of chuck.

The scales 8, 10, 12, on the face-plate, fig. 1, answer as a guide not only in the setting of an eccentric, but also enable the operator, knowing the diameter of the work to be secured, to readily adjust the jaws at the right point. Being scaled in inches, divided into fractions, (8ths, 10ths, 12ths, &c.,) the diameter of the work may be ascertained by the eye, without the use of calipers or other instruments. These scales may be made to any required divisions, decimal, metric, or other.

By loosening the set-screw E, the back-plate is easily removed, and the interior of the chuck is exposed so as to admit of the ready adjustment, cleaning, or repair of any of its parts.

By placing the pinions in the centre of the chuck, the weight of the chuck and the cost of construction are greatly lessened.

Right or left-hand screws may be used to propel the jaws, the choice depending upon the style of lathe used, and work to be accomplished.

The back-plate may be made to cover the edge of the rim of the chuck, or it may be made to play in a groove in the rim, if desired, and may be attached to the gear or hub by any known method.

By the arrangement of the gear in my improved chuck, the time required to operate it and adjust any piece of work, eccentric or other, depends essentially on the speed of the lathe; it also offers the advantage of combining an improved universal chuck with an eccentric-chuck, quick and simple in its operation, thereby lessening the cost of implements, and facilitating the work.

The gear-hub A and gear B of my improved chuck differ essentially from a circular rack placed in the hub, or near the centre of the chuck, as they are not designed to gear the pinions together, but are used as the driver of all the pinions and screws collectively, and are operated by the direct power of the hand, the only use of a wrench or other tool being as hereinbefore shown, whereas in using a circular rack to gear the pinions together, a wrench applied to one of the screws attached to a pinion is the motive-power.

I do not claim the radiating-screws geared together by a circular rack, placed in the hub or near to the centre of the chuck, or the long pinions $g$, or their equivalents, in combination with the nuts $b$, screws $c$, and jaws B, as shown and claimed in the patent of Robert and Thomas Ross, dated August 21, 1866; neither do I claim the driving-screws, pinions, nuts, or jaws, as they have been previously used.

What I claim as new, and desire to secure by Letters Patent, is—

1. The gear-hub A and gear B, having the set-screw E to play in the groove F, to operate as herein set forth, and for the described purposes.

2. The arrangement of the scales 8, 10, 12, on the face-plate, as and for the purposes set forth.

3. The combination, with the centre shaft or gear-hub A, when operated as herein set forth, the knob D or its equivalent, as and for the purposes specified.

4. The combination and arrangement of a universal chuck with a chuck for eccentrics, when constructed substantially as shown and described.

JOSEPH S. MOODY. [L. S.]

Witnesses:
    JNO. W. DEERING,
    WM. HOBSON.